United States Patent
Sakamoto et al.

(10) Patent No.: US 7,193,679 B2
(45) Date of Patent: Mar. 20, 2007

(54) LIQUID CRYSTAL DISPLAY WITH PHOTOSENSITIVE ORGANIC FILM HAVING FIRST, SECOND AND THIRD THICKNESSES IS CORRESPONDING ITS TRANSMISSION, REFLECTIVE AND TERMINAL REGIONS

(75) Inventors: Michiaki Sakamoto, Kanagawa (JP); Hironori Kikkawa, Kanagawa (JP); Naohito Toyomaki, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 131 days.

(21) Appl. No.: 10/657,099

(22) Filed: Sep. 9, 2003

(65) Prior Publication Data

US 2004/0048546 A1 Mar. 11, 2004

(30) Foreign Application Priority Data

Sep. 9, 2002 (JP) .............................. 2002-262485

(51) Int. Cl.
G02F 1/13 (2006.01)
(52) U.S. Cl. ..................... 349/187; 349/114; 349/138; 349/152
(58) Field of Classification Search ................ 349/114, 349/187, 113
See application file for complete search history.

(56) References Cited

U.S. PATENT DOCUMENTS 5,949,507 A * 9/1999 Shimada et al. ............ 349/113
6,184,960 B1 * 2/2001 Sawayama et al. ......... 349/139

FOREIGN PATENT DOCUMENTS

JP 2000-250025 A 9/2000

* cited by examiner

Primary Examiner—Andrew Schechter
(74) Attorney, Agent, or Firm—Sughrue Mion, PLLC

(57) ABSTRACT

A method of fabricating a substrate for a display device prevents the problems occurring in the pattering process of a photosensitive organic material layer, such as the "stage image transfer" and "mask image reflection". A photosensitive organic material layer is formed on or over a transparent plate, the layer being divided into a display section and a terminal section located outside the display section. The photosensitive organic material layer has a first thickness in the display section and a second thickness different from the first thickness in the terminal section. The layer is exposed to exposing light in such a way that the layer in the display section is exposed at a first exposure value according to the first thickness and the layer in the terminal section is exposed at a second exposure value according to the second thickness.

5 Claims, 9 Drawing Sheets

LIQUID CRYSTAL DISPLAY WITH PHOTOSENSITIVE ORGANIC FILM HAVING FIRST, SECOND AND THIRD THICKNESSES IS CORRESPONDING ITS TRANSMISSION, REFLECTIVE AND TERMINAL REGIONS

BACKGROUND OF THE INVENTION

1. Field of the Invention

The present invention relates to a liquid-crystal display (LCD) device. More particularly, the invention relates to a method of fabricating a substrate for a LCD device having a photosensitive organic material layer as an insulating layer, a method of a LCD device using a photosensitive organic material layer formed on one of two substrates, and a semi-transmissive type LCD device.

2. Description of the Related Art

LCD devices have an advantage of compactness, thinness, and low-power dissipation. Therefore, in recent years, LCD devices have been practically applied to various fields such as OA (Office Automation) and portable electronic instruments fields. As known well, LCD devices are usually classified into the "transmissive type" and the "reflective type".

With the transmissive type LCD device, "an illumination source (i.e., a backlight)" is incorporated. This is because the device of this type has no function of emitting light unlike CRTs (Cathode-Ray Tubes) and EL (ElectroLuminescent) devices. The light emitted from the backlight is controlled (i.e., transmitted or blocked) with the liquid-crystal panel, thereby displaying images on the screen. Thus, the transmissive type LCD device is capable of displaying bright images regardless of ambient conditions. However, the backlight dissipates comparative much power and occupies almost half of the total power dissipation of the device. Therefore, the backlight forms the cause of power dissipation increase. In particular, when the device is driven with a battery, the maximum operable time of the device will be largely shortened due to the backlight. To avoid the disadvantage of shortened operable time, a large-sized battery can be incorporated. In this case, however, the total weight and size of the device will increase, degrading the advantage of compactness and lightweight.

To solve the problem of large power dissipation due to the backlight, the "reflective type" LCD device has been developed, where images are displayed on its screen utilizing ambient light. With the reflective type LCD device, a reflection layer or plate is provided instead of the backlight. The ambient light reflected by the reflection layer/plate is controlled (i.e., transmitted or blocked) with the liquid-crystal panel, thereby displaying images on the screen. In this way, the backlight is unnecessary and therefore, the reflective type LCD device has an advantage that the power dissipation is conspicuously lowered and that the compactness and lightweight is improved. Instead, the device of this type has a disadvantage that visibility will degrade under the condition that usable ambient light is insufficient (i.e., where the device is used in the dusk or ill-lighted places).

Accordingly, to solve both the problem of large power dissipation due to the backlight and the problem of the possibility of visibility degradation dependent on the ambient situation, the "semi-transmissive type" LCD device has been developed. This device is capable of displaying images as the transmissive type device or the reflective type device according to the necessity, where each pixel area has a transmission region and a reflection region. The reflection layer/plate is provided only in the reflection region. No reflection layer/plate exists in the transmission region. If the ambient light is sufficient, the backlight is turned off and the device is operated as the reflective type device, thereby reducing the power dissipation. On the other hand, if the ambient light is insufficient, the backlight is turned on and the device is operated as the transmissive type device, thereby raising the visibility.

Conventionally, with the above-described prior-art reflective and semi-transmissive type LCD devices, to improve the reflection characteristic or performance of the reflection regions, a patterned photosensitive organic material layer is used. Specifically, a photosensitive organic material layer with a thickness of several micrometers is formed on a substrate by coating. Thereafter, the photosensitive organic material layer is subjected to an exposure process and a development process, thereby patterning the layer and forming desired projections and depressions on its surface. Subsequently, a reflection layer is selectively formed on the projected and depressed surface of the photosensitive organic material layer. Thus, ambient light will be irregularly reflected by the reflection layer as desired, improving the reflection characteristics.

FIGS. 1A to 1D show a method of fabricating the TFT (Thin-Film Transistor) substrate of a prior-art reflective type LCD device, which is disclosed in the Japanese Non-Examined Patent Publication No. 2000-250025 published on Sep. 14, 2000. Although many pixel areas are arranged in a matrix array, only two pixel areas are shown in FIGS. 1A to 1D for simplification of description. This method is termed the "1 PR process".

First, as shown in FIG. 1A, gate electrodes 102 and common electrode lines 102a are formed on a transparent dielectric plate 101. A common gate dielectric layer 103 is formed on the plate 101 to cover the gate electrodes 102 and the common electrode lines 102a. Patterned (i.e., island-shaped) amorphous silicon (a-Si) layers 104a, patterned (i.e., island-shaped) n$^+$-type a-Si layers 104b, source electrodes 105, and drain electrodes 106 are formed on or over the gate dielectric layer 103. Thus, TFTs 107 for the respective pixel areas are formed on the substrate 101. A passivation layer 108 is formed to cover the TFTs 7. The state at this stage is shown in FIG. 1A. The reference numeral 121 denotes channel regions of the respective TFTs 107.

Subsequently, a base surface having projections and depressions is formed to make inequalities of a reflection electrode layer. Concretely, as shown in FIG. 1B, a photosensitive organic resin is coated onto the passivation layer 108, forming a photosensitive organic resin layer 110 as an insulating layer. Thereafter, using different masks, the contact-hole areas are exposed to ultraviolet (UV) light at a first exposure value UV1 and the inequality areas are exposed to UV light at a second exposure value UV2. The second exposure value UV2 for the inequality areas is set at 10 to 50% of the first exposure value UV1 for the contact-hole areas. The state at this state is shown in FIG. 1B.

Next, the photosensitive organic resin layer 110 thus exposed is developed. In this development process, a fact that the dissolution rate of a positive-type photosensitive organic resin varies largely dependent on the decomposition rate of the sensitizer contained in the resin is utilized. Specifically, due to the difference between the first and second exposure values UV1 and UV2, the decomposition rate of the sensitizer of the layer 110 in the inequality areas and that in the contact-hole areas are different from each other. As a result, the dissolution rate in the inequality areas is different from that in the contact-hole areas. The development time is set in such a way that the parts of the layer 110 in the contact-hole areas are fully resolvable. In this way, contact holes 111 with a depth A' are formed to penetrate the layer 110 and at the same time, surface depressions 113 with a depth B' are formed on the layer 110, as shown in FIG. 1C.

The above-described exposure process may be carried out using a halftone mask, where the mask has reflection parts selectively formed for the projections 114 of the photosensitive resin layer 110, transmission parts selectively formed for the contact holes 111 (and the G-D conversion sections and terminal sections, not shown), and semi-transmission parts selectively formed for the depressions 113 of the layer 110. By the use of the halftone mask, there is an advantage that the projections 114 and depressions 113 of the layer 110 and the contact holes 111 are simultaneously formed through a single exposure process.

Needless to say, the above-described exposure process may be carried out using an ordinary mask having only reflection parts and transmission parts. In this case, the inequality areas and the contact-hole areas of the photosensitive organic resin layer 110 are subjected to separate exposure processes with different exposure values. Additionally, in the process of forming the base surface with projections and depressions for a reflection electrode layer, the layer 110 may have a single-layer or two-layer structure.

Finally, as shown in FIG. 1D, an aluminum (Al) layer is deposited on the photosensitive organic resin layer 110 thus inequalized over the whole plate 101 by a sputtering or evaporation process, thereby forming a reflection electrode layer 112 on the layer 110. Thereafter, although not shown, an alignment layer made of polyimide is formed on the reflection electrode layer 112. As a result, the TFT substrate is completed.

The TFT substrate formed is then coupled with an opposite substrate (not shown) having a color filter, a black matrix, an opposite electrode, and an alignment layer in such a way as to sandwich a liquid-crystal layer. Thus, a reflective type LCD device is completed.

Next, a prior-art transmissive type LCD device is explained. FIG. 2 shows the structure of a prior-art LCD device of this type.

As shown in FIG. 2, this device comprises an active matrix substrate 213 on which switching elements (i.e., TFTs 207) are formed, an opposite substrate 217 on which a color filter 215 and a black matrix (not shown) are formed, a liquid-crystal layer 218 sandwiched by the substrates 213 and 217, and a backlight 220 located behind the active-matrix substrate 213. Although many pixel areas are arranged in a matrix array, only one pixel area is shown in FIG. 2 for simplification of description.

On the active-matrix substrate 213, gate or scanning lines (not shown), data or signal lines (not shown), TFTs 207, and pixel electrodes (not shown) are formed over a transparent, dielectric plate 201. The TFTs 207, each of which comprises a gate electrode 202, an island-shaped a-Si layer 204, a source electrode 205, and a drain electrode 206, are arranged near the respective intersections of the gate and data lines. The drain electrodes 206 of the TFTs 207 are connected to the corresponding data lines. The source electrodes 205 of the TFTs 207 are connected to the corresponding pixel electrodes. The gate electrodes 202 of the TFTs 207 are formed on the plate 201. A common gate dielectric layer 203 is formed on the plate 201 to cover the gate electrodes 202. A passivation layer 208 is formed on the layer 203 to cover the TFTs 207. A transparent electrode layer 209, which is made of ITO (Indium Tin Oxide), is formed on the passivation layer 208 to be connected to the source electrodes 205.

Each of the pixel areas is divided into a reflection region 222a that reflects ambient light and a transmission region 222b that allows the light from the backlight 220 to penetrate through the region 222b.

In the reflection region 222a, a photosensitive organic resin layer 210 is selectively formed on the electrode layer 209. The layer 210 has inequalities, i.e., projections and depressions. A reflection electrode layer 212, which is made of Al or an alloy of Al, is selectively formed on the layer 210. The reference numeral 211 denotes the contact hole penetrating through the photosensitive organic resin layer 210. An alignment layer 219a is formed on the layer 210 to cover the reflection electrode layer 212. On the other hand, in the transmission region 222b, the photosensitive organic resin layer 210 does not exist and the alignment layer 219a is formed directly on the electrode layer 209.

On the opposite substrate 217, the color filter 215 and the opposite electrode 216 are successively formed on a transparent, dielectric plate 214. An alignment layer 219b is formed to cover the electrode 216.

With the prior-art semi-transmissive type LCD device shown in FIG. 2, the light from the backlight 220 by way of the active-matrix substrate 213 transmits the liquid-crystal layer 218 in the transmission region 222b of the pixel area and then, goes out of the opposite substrate 217. In the reflection region 222a of the pixel area, ambient light which has entered the liquid-crystal layer 218 through the opposite substrate 217 is reflected toward the opposite substrate 217 by the reflection electrode layer 212. Thereafter, the ambient light thus reflected penetrates through the substrate 217 again and goes out of the same.

The thickness of the photosensitive organic resin layer 210 is set in such a way that the gap or thickness of the liquid-crystal layer 218 in the reflection region 222a is approximately equal to half of the gap or thickness of the layer 218 in the transmission region 222b. Therefore, the optical path length of the layer 218 in the reflection region 222a is approximately equalized to that in the transmission region 222b, thereby adjusting or controlling the polarization state of the output light.

The method of fabricating the prior-art semi-transmissive type device of FIG. 2 is approximately the same as the method for the prior-art reflective type device of FIGS. 1A to 1D, except that all the part of the photosensitive organic resin layer 210 existing in the transmission region 222b is removed in the step of forming the projections and depressions of the layer 210.

The above-described prior-art methods of the LCD devices have the following problems.

With the method of fabricating the prior-art reflective type device of FIGS. 1A to 1D, the contact-hole areas are exposed to UV light at the first exposure value UV1 and the inequality areas are exposed to UV light at the second exposure value UV2 different from the first exposure value UV1. Thus, the photosensitive resin layer 110 is selectively removed in the contact-hole areas to form the contact holes 111. On the other hand, the layer 110 is selectively removed in the inequality areas to form the inequalities of the layer 110.

Moreover, with the method of fabricating the prior-art semi-transmissive type device of FIG. 2, like the device of FIGS. 1A to 1D, the reflection regions 222a and the transmission regions 222b are exposed to light at different exposure values, respectively. Thus, the photosensitive resin layer 210 is selectively removed in the reflection regions 222a to form the contact holes 211 and the inequalities of the layer 210. On the other hand, the layer 210 is entirely removed in the transmission regions 222b.

As shown in FIG. 3, the prior-art semi-transmissive type device of FIG. 2 has the rectangular display section 222 for displaying images and the rectangular-ring-shaped terminal section 223 for interconnection with the external circuitry. The terminal section 223 is formed outside the display section 22 in such a way as to surround the entire section 222. The photosensitive resin layer 210 existing in the terminal section 223 needs to be removed in the process of forming the inequalities of the layer 210 and the contact holes 211. In the method of fabricating the prior-art device of FIG. 2, the exposure value for removing the layer 210 in the terminal section 223 is equalized to the exposure value for selectively removing the layer 210 to form the contact holes 211 in the reflection regions 222a and that for removing the layer 210 in the transmission regions 222b.

However, the device has inequalities not only caused by the TFTs 207 and the gate and data lines but also caused by the existence and absence of the gate dielectric layer 203 and the passivation layer 208. Therefore, when the photosensitive organic resin layer 210 is formed by uniformly coating, the thickness of the layer 210 varies according to these inequalities. The thickness of the layer 210 in the terminal section 223 is likely to be larger than that in the display section 222. This is because the gate dielectric layer 203 and the passivation layer 208 do not exist in the terminal section 223.

For example, the thickness of the photosensitive organic resin layer 210 in the contact-hole areas of the display section 222 is approximately 2 µm while the thickness of the layer 210 in the terminal section 223 is approximately 2.75 µm. To simultaneously remove the layer 210 in the contact-hole areas of the display section 222 and the terminal section 223, the exposure condition needs to be determined in such a way that the relatively thicker layer 210 in the terminal section 223 is fully removed. Therefore, the relatively thinner layer 210 in the display section 222 will be excessively exposed. Specifically, the layer 210 in the contact-hole areas of the reflection regions 222a of the display section 222 and the transmission regions 222b thereof will be in over-exposure state. If the display section 222 is over-exposed, some defects (e.g., stage image transfer and mask image reflection) will be observed in the displaying operation.

With a typical exposure apparatus, chucks and/or pins are provided on the exposure stage to hold the active-matrix substrate 213 thereon. The surface of the stage has a reflection factor or reflectance different from that of the chucks and/or pins. Therefore, if the photosensitive organic resin layer 210 of the substrate 213 is over-exposed, the exposing light penetrates through the substrate 213 and reflected by the stage surface and the chucks and pins, thereby affecting the layer 210. Due to this effect, the dissolution rate of the layer 210 will deviate from its desired values. As a result, an image of the exposure stage (i.e., the stage surface and the chucks and/or pins) will be slightly or thinly transferred to the layer 210 after the development process is completed. This phenomenon is termed the "stage image transfer".

Moreover, with a typical exposure apparatus called the "stepper", the exposure mask comprises a plurality of exposing patterns. The exposing operation (i.e., the shot) is carried out while one of the patterns is selected and the remainder is covered with the blind. In this case, the exposing light is likely to be reflected by the patterns to be covered and/or by the edges of the blind. The light reflected may be further reflected by a lens system incorporated in the exposure apparatus, being irradiated to the substrate 213 held on the stage as stray light. The stray light will affect the photosensitive organic resin layer 210 and as a result, the dissolution rate of the layer 210 will deviate from its desired values. Thus, an image of the undesired patterns on the mask and/or the blind edges will be slightly transferred to the layer 210 after the development process is completed. This phenomenon is termed the "mask image reflection".

SUMMARY OF THE INVENTION

The present invention was created through the consideration about the above-described problems.

Accordingly, an object of the present invention is to provide a method of fabricating a substrate for a display device that prevents effectively the problems occurring in the pattering process of a photosensitive organic material layer, such as the "stage image transfer" and "mask image reflection".

Another object of the present invention is to provide a method of fabricating a LCD device that prevents effectively the problems occurring in the pattering process of a photosensitive organic material layer, such as the "stage image transfer" and "mask image reflection".

Still another object of the present invention is to provide a semi-transmissive type LCD device that prevents effectively the problems occurring in the pattering process of a photosensitive organic material layer, such as the "stage image transfer" and "mask image reflection".

The above objects together with others not specifically mentioned will become clear to those skilled in the art from the following description.

According to a first aspect of the present invention, a method of fabricating a substrate for a display device is provided. This method comprises the steps of:

forming a photosensitive organic material layer on or over a transparent plate, the layer being divided into a display section and a terminal section located outside the display section, and the layer having a first thickness in the display section and a second thickness different from the first thickness in the terminal section; and exposing the layer to exposing light in such a way that the layer in the display section is exposed at a first exposure value according to the first thickness and the layer in the terminal section is exposed at a second exposure value according to the second thickness.

With the method according to the first aspect of the present invention, the photosensitive organic material layer is exposed to exposing light in such a way that the layer in the display section is exposed at a first exposure value according to the first thickness and the layer in the terminal section is exposed at a second exposure value according to the second thickness. Therefore, the exposed value for the layer is entirely optimized, eliminating its over exposure. As a result, the problems occurring in the pattering process of a photosensitive organic material layer, such as the "stage image transfer" and "mask image reflection", are prevented effectively.

According to a second aspect of the present invention, another method of fabricating a substrate for a display device is provided. This method comprises the steps of:

forming a photosensitive organic material layer on or over a transparent plate, the layer being divided into a display section and a terminal section located outside the display section, and the layer having a first thickness in the display section and a second thickness different from the first thickness in the terminal section;

exposing the layer in the display section and the terminal section to exposing light at a first exposure value according to a relatively smaller one of the first thickness and the second thickness; and selectively exposing part of the layer having a relatively larger one of the first thickness and the second thickness to exposing light at a second exposure value.

With the method according to the second aspect of the present invention, the photosensitive organic material layer in the display section and the terminal section is exposed to exposing light at a first exposure value according to a relatively smaller one of the first thickness and the second thickness. Thereafter, part of the layer having a relatively larger one of the first thickness and the second thickness is selectively exposing to exposing light at a second exposure value. Therefore, the exposed value for the layer is entirely optimized, eliminating its over exposure. As a result, the problems occurring in the pattering process of a photosensitive organic material layer, such as the "stage image transfer" and "mask image reflection", are prevented effectively.

According to a third aspect of the present invention, a method of fabricating a LCD device is provided. This method comprises the steps of:

forming a photosensitive organic material layer on or over a transparent plate, the photosensitive organic material layer being divided into a display section and a terminal section located outside the display section, the display section including a reflection region and a contact-hole area, and the photosensitive organic material layer having a first thickness in the reflection region, a second thickness different from the first thickness in the contact-hole area, and a third thickness different from the first and second thicknesses in the terminal section;

exposing the photosensitive organic material layer to exposing light in such a way that the photosensitive organic material layer in the reflection region is exposed at a first exposure value according to the first thickness, the photosensitive organic material layer in the contact-hole area is exposed at a second exposure value according to the second thickness, and the photosensitive organic material layer in the terminal section is exposed at a third exposure value according to the third thickness;

developing the photosensitive organic material layer exposed, thereby forming a first substrate;

forming a second substrate; and coupling the first substrate and the second substrate with each other in such a way as to sandwich a liquid-crystal layer therebetween.

With the method according to the third aspect of the invention, the photosensitive organic material layer has a first thickness in the reflection region, a second thickness different from the first thickness in the contact hole area, and a third thickness different from the first and second thicknesses in the terminal section. The photosensitive organic material layer is exposed to exposing light in such a way that the photosensitive organic material layer in the reflection region is exposed at a first exposure value according to the first thickness, the photosensitive organic material layer in the contact-hole area is exposed at a second exposure value according to the second thickness, and the photosensitive organic material layer in the terminal section is exposed at a third exposure value according to the third thickness. Therefore, the exposed value for the photosensitive organic material layer is entirely optimized, eliminating its over exposure. As a result, the problems occurring in the pattering process of a photosensitive organic material layer, such as the "stage image transfer" and "mask image reflection", are prevented effectively.

In a preferred embodiment of the method according to the third aspect of the present invention, in the step of exposing the photosensitive organic material layer, the contact-hole area and the terminal section are exposed to the light in one shot at the second exposure value, and the terminal section is again exposed to the light in another shot at a difference between the second exposure value and the third exposure value.

In another preferred embodiment of the method according to the third aspect of the present invention, in the step of exposing the photosensitive organic material layer, the contact-hole area and the terminal section are respectively exposed to the light in one shot at the second and third exposure values using a half-tone mask.

In still another preferred embodiment of the method according to the third aspect of the present invention, in the step of exposing the photosensitive organic material layer, the reflection region, the contact-hole area, and the terminal section are respectively exposed to the light in separate shots using different masks. A blind of a stepper used is kept fully open.

In a further preferred embodiment of the method according to the third aspect of the present invention, in the step of exposing the photosensitive organic material layer, the reflection region, the contact-hole area, and the terminal section are respectively exposed to the light using different masks. Each of the masks has a three-layer structure comprising a light-shielding layer for an exposing pattern, and two anti-reflection layers located at each side of the light-shielding layer.

According to a fourth aspect of the present invention, another method of fabricating a LCD device is provided. This method comprises the steps of:

forming a photosensitive organic material layer on or over a transparent plate, the photosensitive organic material layer being divided into a display section and a terminal section located outside the display section, the display section including a reflection region and a transmission region, and the photosensitive organic material layer having a first thickness in the reflection region, a second thickness different from the first thickness in the transmission region, and a third thickness different from the first and second thicknesses in the terminal section;

exposing the photosensitive organic material layer to exposing light in such a way that the photosensitive organic material layer in the reflection region is exposed at a first exposure value according to the first thickness, the photosensitive organic material layer in the transmission region is exposed at a second exposure value according to the second thickness, and the photosensitive organic material layer in the terminal section is exposed at a third exposure value according to the third thickness;

developing the photosensitive organic material layer exposed, thereby forming a first substrate;

forming a second substrate; and coupling the first substrate and the second substrate with each other in such a way as to sandwich a liquid-crystal layer therebetween.

With the method according to the fourth aspect of the invention, the photosensitive organic material layer has a first thickness in the reflection region, a second thickness different from the first thickness in the transmission region, and a third thickness different from the first and second thicknesses in the terminal section. The photosensitive organic material layer is exposed to exposing light in such a way that the photosensitive organic material layer in the reflection region is exposed at a first exposure value according to the first thickness, the photosensitive organic material layer in the transmission region is exposed at a second exposure value according to the second thickness, and the photosensitive organic material layer in the terminal section is exposed at a third exposure value according to the third thickness. Therefore, the exposed value for the photosensitive organic material layer is entirely optimized, eliminating its over exposure. As a result, the problems occurring in the pattering process of a photosensitive organic material layer, such as the "stage image transfer" and "mask image reflection", are prevented effectively.

In a preferred embodiment of the method according to the fourth aspect of the present invention, in the step of exposing the photosensitive organic material layer, the transmission region and the terminal section are exposed to the light in one shot at the second exposure value, and the terminal section is again exposed to the light in another shot at a difference between the second exposure value and the third exposure value.

In another preferred embodiment of the method according to the fourth aspect of the present invention, in the step of exposing the photosensitive organic material layer, the transmission region and the terminal section are respectively exposed to the light in one shot at the second and third exposure values using a half-tone mask.

In still another preferred embodiment of the method according to the fourth aspect of the present invention, in the step of exposing the photosensitive organic material layer, the reflection region, the transmission region, and the terminal section are respectively exposed to the light in separate shots using different masks. A blind of a stepper used is kept fully open.

In a further preferred embodiment of the method according to the fourth aspect of the present invention, in the step of exposing the photosensitive organic material layer, the reflection region, the transmission region, and the terminal section are respectively exposed to the light using different masks. Each of the masks has a three-layer structure comprising a light-shielding layer for an exposing pattern, and two anti-reflection layers located at each side of the light-shielding layer.

According to a fifth aspect of the present invention, a semi-transmissive type LCD device is provided. This device comprises:

a first substrate comprising a transparent plate, switching elements formed on the plate, an inequalized photosensitive organic material layer formed on the plate, and a reflection layer formed on the photosensitive organic material layer;

the first substrate being divided into a reflection region and a transmission region in each pixel area, and the photosensitive organic material layer being located in the reflection region;

a light-shielding layer formed on the first substrate in such a way as to be located behind the photosensitive organic material layer;

the light-shielding layer covering a neighborhood of a boundary between the reflection region and the transmission region, an edge of the photosensitive organic material layer being included in the neighborhood;

a second substrate coupled with the first substrate; and a liquid-crystal layer sandwiched by the first and second substrates.

With the LCD device according to the fifth aspect of the present invention, a light-shielding layer is formed on the first substrate in such a way as to be located behind the inequlaized photosensitive organic material layer. The light-shielding layer covers a neighborhood of a boundary between the reflection region and the transmission region. An edge of the photosensitive organic material layer is included in the neighborhood. Therefore, the light penetrating through the edge of the photosensitive organic resin layer is shielded or blocked by the light-shielding layer. Thus, the effect to prevent the "stage image transfer" problem is enhanced.

In a preferred embodiment of the device according to the fifth aspect of the present invention, the neighborhood covered with the light-shielding layer has an inward distance and an outward distance along the first substrate from the edge of the photosensitive organic resin layer. Each of the inward distance and the outward distance is equal to 5 μm or greater.

In another preferred embodiment of the device according to the fifth aspect of the present invention, the light-shielding layer is located in a same level as scanning lines or signal lines formed on or over the first substrate.

In still another preferred embodiment of the device according to the fifth aspect of the present invention, the light-shielding layer is formed by a storage electrode formed on the first substrate.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1A:
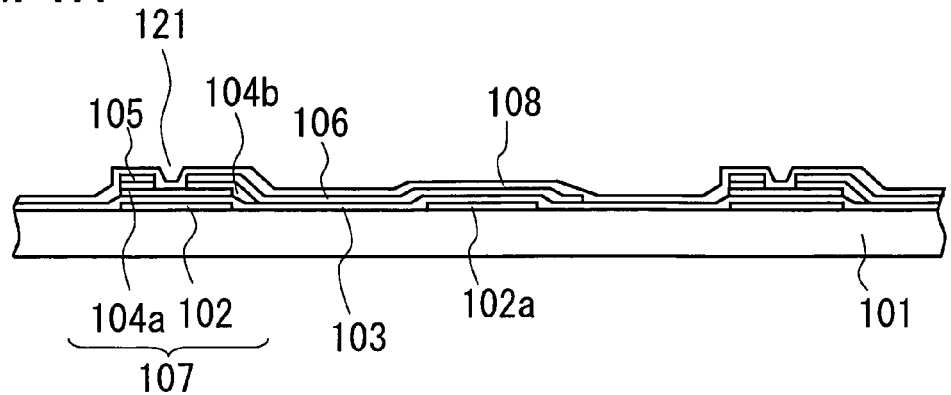
FIGS. 1A to 1D are partial cross-sectional views showing a method of fabricating the TFT substrate of a prior-art reflective type LCD device, respectively.
Figure 1B:
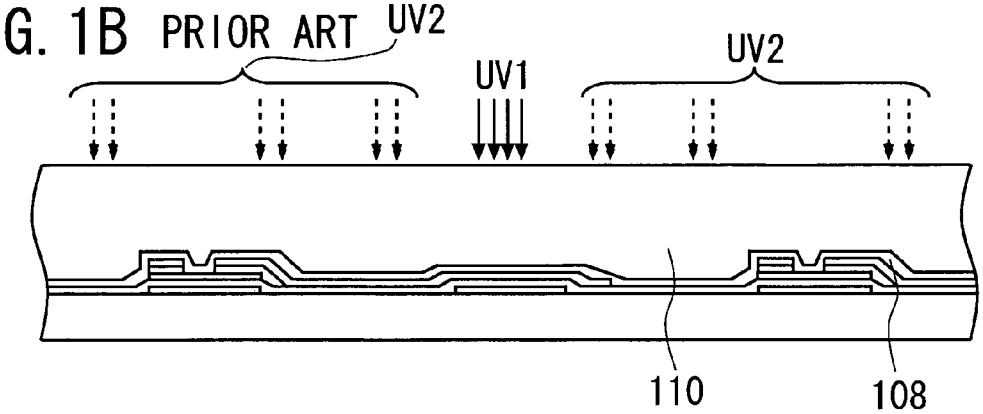
Figure 1C:
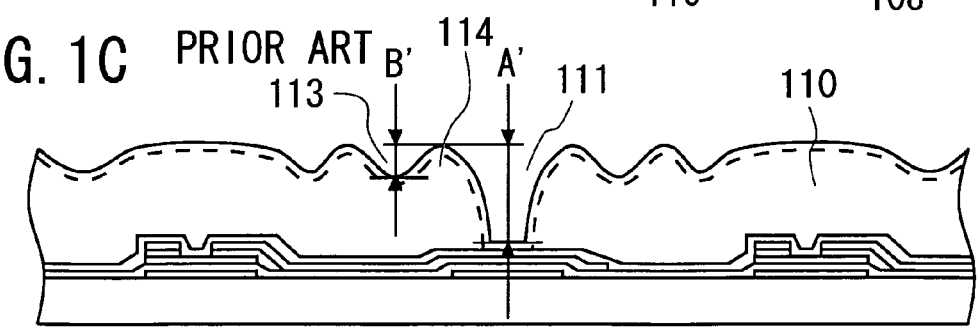
Figure 1D:
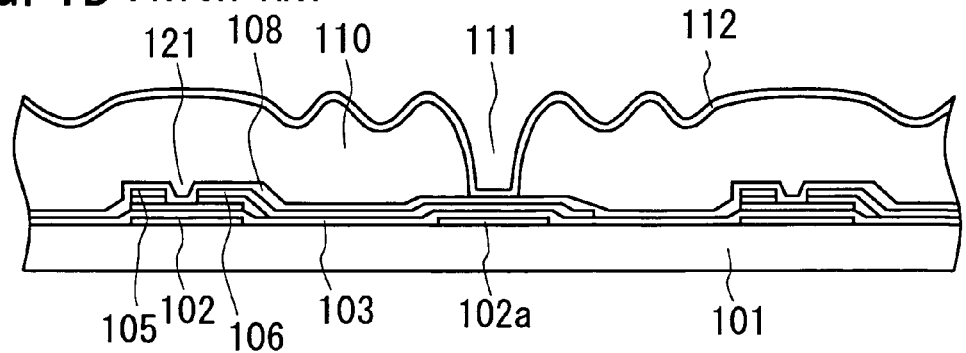

Preferred embodiments of the present invention will be described in detail below while referring to the drawings attached.

As explained previously, if the display section of a reflective type or semi-transmissive type LCD device is over-exposed in the process of exposing the photosensitive organic material layer, the stage image transfer problem and/or the mask image reflection problem is/are likely to occur. To solve these problems, the inventors carried out various experiments and as a result, they found it most effective to make the exposure value in the transmission region of the display section appropriate. The following is the inventors experiments and their results, where a stepper-type exposure apparatus was used.

The exposure value (i.e., EX3 in FIG. 4C) to the photosensitive organic resin layer in the inequality areas of the display section was fixed at 100 mJ. On the other hand, the exposure value (i.e., EX2 in FIG. 4C) to the same photosensitive organic resin layer in the contact-hole areas of the reflection regions and the transmission regions (i.e., the removal areas) of the display section was changed in the range from 150 mJ to 400 mJ. The thickness of the photosensitive organic resin layer coated was set at 2 μm. Since the thickness of the gate dielectric layer was 550 nm and that of the passivation layer was 200 nm, the thickness of the photosensitive organic resin layer in the terminal section was larger than that in the display section by 750 nm.

In this case, the display unevenness level reflecting the stage image transfer problem and/or the mask image reflection problem was given as shown in Table 1 below. In the column "PHOTOSENSITIVE ORGANIC RESIN LAYER" of Table 1, "○" means that the photosensitive resin layer was entirely removed while "X" means that the photosensitive resin layer was partially left. In the column "DISPLAY UNEVENNESS LEVEL" of Table 1, "○" means that the stage image transfer or mask image reflection problem was not observed, "X" means that the stage image transfer or mask image reflection problem was clearly observed, and "Δ" means that the stage image transfer or mask image reflection problem was slightly observed.

TABLE 1

| EXPOSURE VALUE IN INEQUALITY AREAS | EXPOSURE VALUE IN REMOVAL AREAS | PHOTOSENSITIVE ORGANIC RESIN LAYER | | DISPLAY UNEVENNESS LEVEL | |
|---|---|---|---|---|---|
| | | TERMINAL SECTION | DISPLAY SECTION | STAGE IMAGE TRANSFER | MASK IMAGE REFLECTION |
| 100 mJ | 150 mJ | X | X | ○ | ○Δ |
| 100 mJ | 200 mJ | X | ○ | ○ | Δ |
| 100 mJ | 250 mJ | X | ○ | ○ | Δ |
| 100 mJ | 300 mJ | ○ | ○ | Δ | ΔX |
| 100 mJ | 350 mJ | ○ | ○ | XΔ | X |
| 100 mJ | 400 mJ | ○ | ○ | XΔ | X |

As seen from Table 1, to prevent the stage image transfer problem, the exposure value (i.e., EX2 in FIG. 4C) in the contact-hole areas of the reflection regions and the transmission regions of the display section (i.e., the removal areas) needs to be 250 mJ or less. On the other hand, to prevent the photosensitive organic resin layer from being left in the terminal section, it needs to be 300 mJ or greater. As a result, it was found that there is no appropriate exposure value to avoid the stage image transfer problem while preventing the photosensitive organic resin layer from being left in the terminal section.

Here, the mechanism of the stage image transfer problem is explained with reference to FIG. 7, where the state of the active-matrix substrate 13 held on the exposure stage 24 in the exposure process is schematically shown. The substrate 13 comprises a transparent, dielectric plate 1 and a photosensitive organic resin layer 10 formed on the plate 1.

Figure 7:
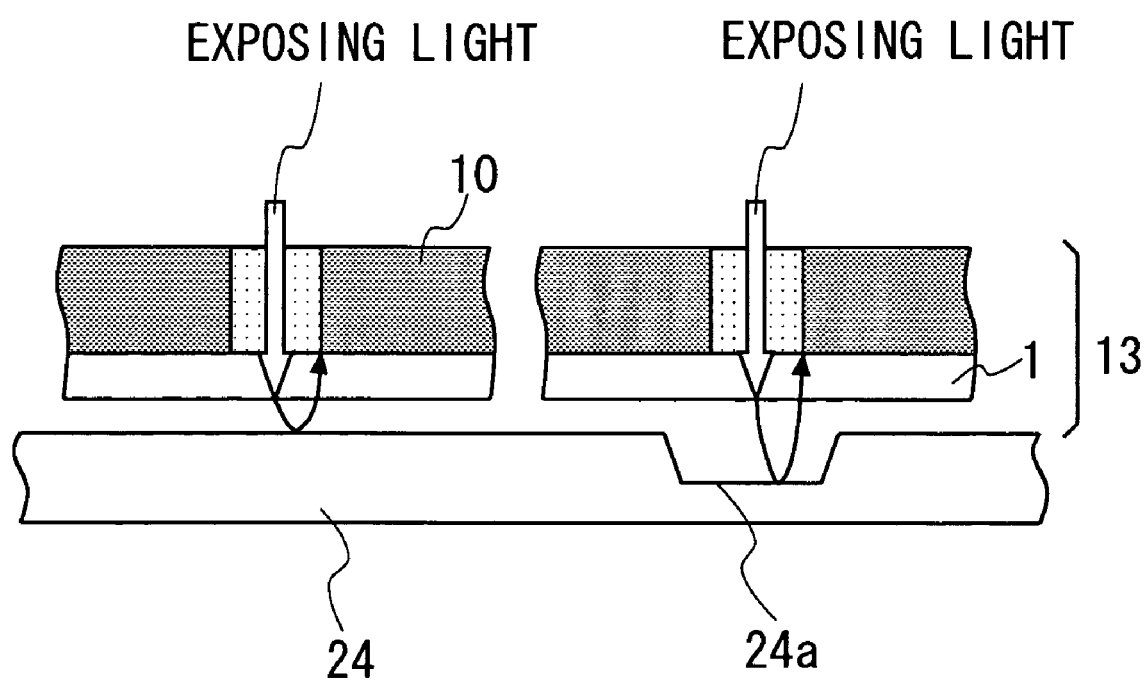
FIG. 7 is a partial, schematic cross-sectional view of an active-matrix substrate placed on the exposure stage of an exposure apparatus, which explains the cause of the "stage transfer" problem in a LCD device.

As shown in FIG. 7, chucks or pins 24a are formed on the surface of the exposure stage 24. The reflectance of the chucks/pins 24a is different from that of the surface of the stage 24. Therefore, when the exposing light is excessively irradiated to the substrate 13, the light will penetrate through the plate 1 of the substrate 13 to be reflected by the surface of the stage 24 or chucks/pins 24a toward the photosensitive organic resin layer 10. Thus, the dissolution rate of the layer 10 in its irradiated parts by the reflected light will deviate from its desired value. As a result, an image of the stage 24 will be thinly transferred to the layer 10 after the development process of the layer 10 is completed.

Based on the above-described result of the experiments, it was seen that the stage image transfer problem was observed or not, which was dependent on the exposure value in the removal areas in the display section. Specifically, if the exposure value was equal to 250 mJ or less, the reflected light by the stage 24 did not affect the photosensitive organic resin layer 10 effectively. As a result, a transferred image of the stage 24 would not be observed.

Taking the above-described experimental results into consideration, the inventors found that it is preferred that the exposure value for selectively removing the photosensitive organic resin layer 10 in the display section is different from that in the terminal section. Therefore, the inventors carried out the following experiment under the condition shown in Table 2, i.e., the exposure value in the removal areas of the display section was fixed at 200 mJ and the exposure value in the terminal section was set at 300 mJ.

TABLE 2

| EXPOSURE VALUE IN INEQUALITY AREAS | EXPOSURE VALUE IN REMOVAL AREAS | EXPOSURE VALUE IN TERMINAL SECTION | PHOTOSENSITIVE ORGANIC RESIN LAYER | | DISPLAY UNEVENNESS LEVEL | |
|---|---|---|---|---|---|---|
| | | | TERMINAL SECTION | DISPLAY SECTION | STAGE IMAGE TRANSFER | MASK IMAGE REFLECTION |
| 100 mJ | 200 mJ | 300 mJ | ○ | ○ | ○ | Δ~X |

When the photosensitive organic resin layer 10 was exposed to the exposing light under the condition of Table 2, the layer 10 in the terminal section was entirely removed and the stage image transfer problem was not observed. However, the mask image reflection problem was still observed.

To find the reason why the mask image reflection problem was not prevented, the inventors investigated the reflected pattern onto the layer 10 in detail. As a result, they found the fact that an image of the terminal section (which is covered with the blind) and an image of the blind edge were transferred or reflected to the layer 10.

The mask used here comprised a display section pattern for selectively removing the photosensitive organic resin layer 10 in the display section and a terminal section pattern for selectively removing the same layer 10 in the terminal section. When the layer 10 in the display section was selectively removed in a shot, the display section pattern was used to selectively irradiate the exposing light to the layer 10 at an exposure value while covering the terminal section pattern with the blind. On the other hand, when the layer 10 in the terminal section was selectively removed in another shot, the terminal section pattern was used to selectively irradiate the exposing light to the layer 10 at a different exposure value while covering the display section pattern with the blind. Accordingly, the inventors made the supposition as follows.

Figure 8A:
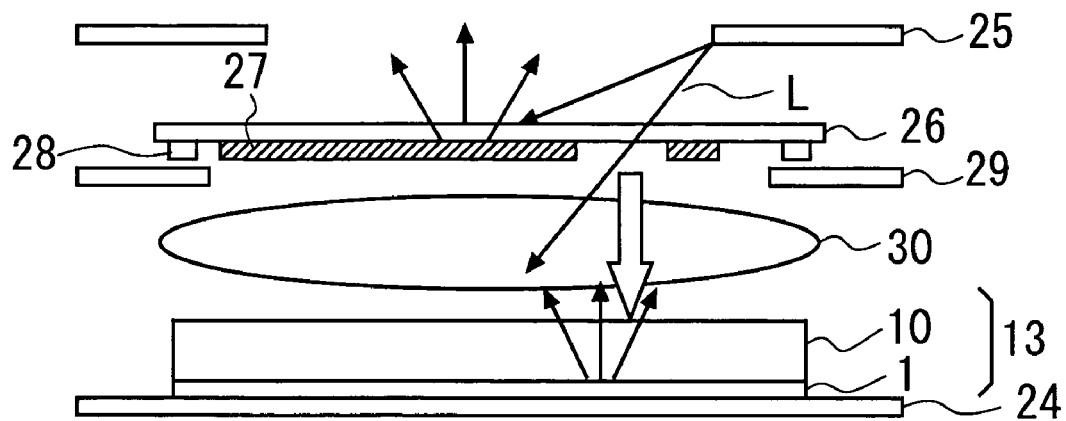
FIG. 8A is a schematic cross-sectional view of a stepper, which explains the cause of the "mask image reflection" problem in the exposure process of the photosensitive organic resin layer of a LCD device.
Figure 8B:
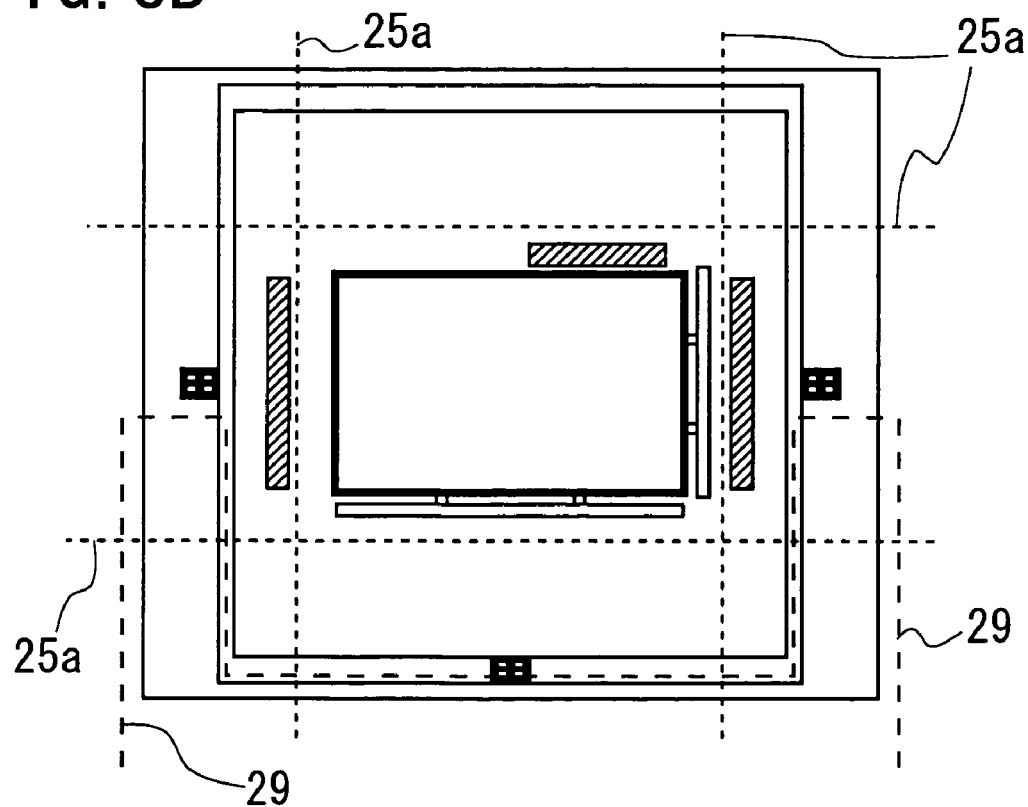
FIG. 8B is a schematic plan view of the stepper of FIG. 8A, which explains the cause of the "mask image reflection" problem in the exposure process of the photosensitive organic resin layer of a LCD device.

FIGS. 8A and 8B schematically show the structure of a stepper and the positional relationship of the mask or reticle with the components of the stepper. In FIG. 8A, an active-matrix substrate 13 having a transparent, dielectric plate 1 and a photosensitive organic resin layer 10 formed thereon is held on the exposure stage 24. A projection lens system 30 is provided over the stage 24. A reticle or mask 26 having an exposing pattern 27 on its lower surface is placed over the lens system 30. The pattern 27 comprises a display section sub-pattern and a terminal section sub-pattern. A reticle mark 28 is formed on the lower surface of the reticle 26. A blind 25 is provided over the reticle 26. The blind 26 has edges 25a, as shown in FIG. 8B. In FIG. 8B, the reference numeral 29 denotes a bar-code shutter.

When the display section is exposed by using the reticle 26 in a shot with the stepper of FIGS. 8A and 8B, the terminal section sub-pattern of the reticle 26 is selectively covered or blocked with the blind 25. In this case, the exposing light is irradiated downwardly to the photosensitive organic resin layer 10 of the substrate 13 by way of the reticle 26 and the projection lens system 30. The light thus irradiated is partially reflected by the upper and lower surfaces of the reticle or mask 26 and/or the lens system 30. The light thus reflected is partially reflected again by the edges of the blind 25 toward the substrate 13. As a result, it is supposed that the light thus reflected to the photosensitive organic resin layer 10 of the substrate 13 induces the mask image reflection problem.

Figure 9:
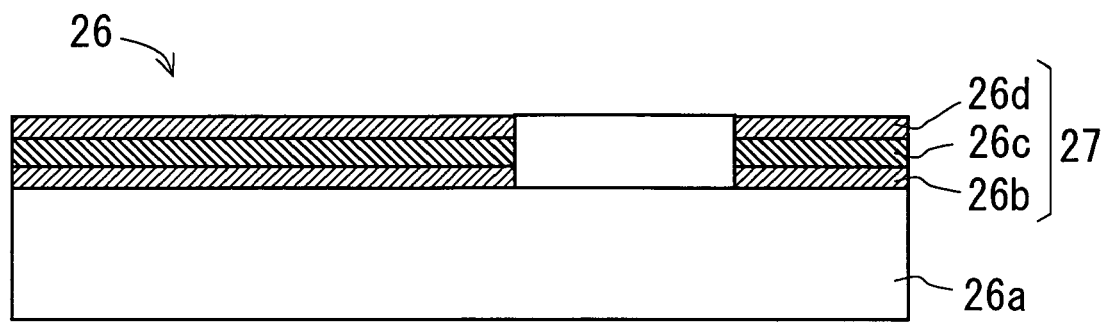
FIG. 9 is a schematic cross-sectional view of a reticle, in which a three-layer structured pattern is formed on a glass plate, which is used in the method of fabricating a semi-transmissive type LCD device according to the first embodiment of the invention.

Based on the above supposition, to prevent the reflected light from reaching the layer 10, the blind 25 was kept fully opened (i.e., the blind 25 was not used) and at the same time, the display and terminal section sub-patterns of the pattern 27 were formed on separate masks or reticles 26. Furthermore, the display and terminal section sub-patterns were formed to have a three-layered structure. Specifically, as shown in FIG. 9, the pattern 27 (i.e., the display and terminal section sub-patterns) has a chromium oxide (CrO) layer 26b formed on a glass plate 26a, a Cr layer 26c formed on the CrO layer 26b, and a CrO layer 26d formed on the Cr layer 26c. The Cr layer 26c, which serves as a light-shielding layer, forms the desired sub-patterns of the display and terminal sections. The CrO layers 26b and 26d placed at each side of the Cr layer 26c serve as anti-reflection layers. In this case, the mask image reflection problem was completely prevented, as shown in Table 3 below.

Additionally, the mask image reflection problem was completely prevented like the above case using the three-layered structure of FIG. 9, when the anti-reflection layers 26b and 26d made of CrO were respectively replaced with diffusion films serving as irregular reflection layers.

TABLE 3

| EXPOSURE VALUE IN INEQUALITY AREAS | EXPOSURE VALUE IN REMOVAL AREAS | EXPOSURE VALUE IN TERMINAL SECTION | PHOTOSENSITIVE ORGANIC RESIN LAYER | | DISPLAY UNEVENNESS LEVEL | |
|---|---|---|---|---|---|---|
| | | | TERMINAL SECTION | DISPLAY SECTION | STAGE IMAGE TRANSFER | MASK IMAGE REFLECTION |
| 100 mJ | 200 mJ | 300 mJ | ○ | ○ | ○ | ○ |

The following first to third embodiments are based on the above-described experimental results obtained by the inventors. In these embodiments, the invention is applied to a semi-transmissive type LCD device. However, needless to say, the invention is applicable to a reflective type LCD device. This is because the photosensitive organic resin layer for the semi-transmissive type LCD device has a structure obtained by additionally forming the transmission regions in the photosensitive organic resin layer for the reflective type LCD device.

First Embodiment

A method of fabricating a semi-transmissive type LCD device according to a first embodiment is explained below with reference to FIGS. 4A to 4C and FIGS. 5A to 5C.

Figure 4A:
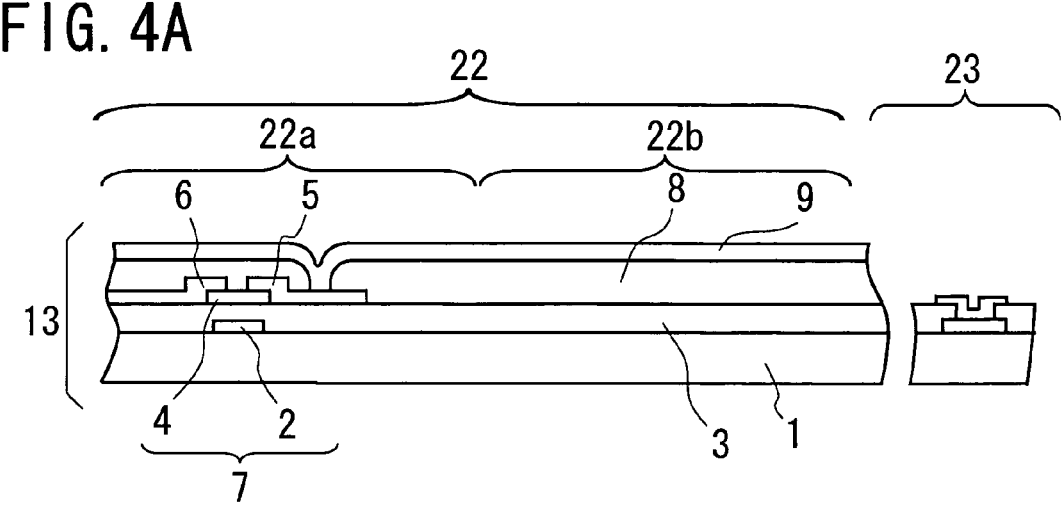
FIGS. 4A to 4C are partial cross-sectional views showing a method of fabricating an active-matrix substrate of a semi-transmissive type LCD device according to a first embodiment of the invention, respectively.

First, as shown in FIG. 4A, a metal such as Cr is deposited on a transparent, dielectric plate (e.g., a glass plate) 1, forming a metal layer with a thickness of approximately 200 nm. The metal layer thus formed is patterned by known photolithography and etching techniques, thereby forming gate or scanning lines (not shown), gate electrodes 2 of TFTs 7, common storage lines (not shown), and auxiliary storage electrodes (not shown) on the plate 1. Next, a gate dielectric layer 3 with a thickness of approximately 550 nm, which is made of $SiO_2$, $SiN_x$, or $SiO_x$, is formed on the plate 1 to cover the gate lines, the gate electrodes 2, the common storage lines, and the auxiliary storage electrodes. A semiconductor layer 4 with a thickness of approximately 250 nm, which is made of a-Si, is formed on the gate dielectric layer 3 and patterned to be island-shaped. A metal layer (e.g., a Cr layer) with a thickness of approximately 200 nm is deposited to cover the layer 4 and patterned, thereby forming data or signal lines (not shown), drain electrodes 6 and source electrodes 5 of the TFTs 7, and storage electrodes (not shown). A dielectric layer with a thickness of approximately 200 nm, which is made of $SiN_x$, is formed by a plasma-enhanced CVD (Chemical Vapor Deposition) method, thereby forming a passivation layer 8 for protecting the TFTs 7. A transparent electrode layer 9, which is made of ITO, is formed on the passivation layer 8 to be connected to the source electrodes 5 by way of corresponding contact holes of the layer 8.

The reference numerals 22 and 23 in FIG. 4A denote the display sections and the terminal sections, respectively. Each of the display section 22 is divided into a reflection region 22a and a transmission region 22b. Although many pixel areas are arranged in a matrix array, only one pixel area (which includes one reflection region 22a and one transmission region 22b) is shown in FIGS. 4A to 4C for simplification of description.

Figure 4B:
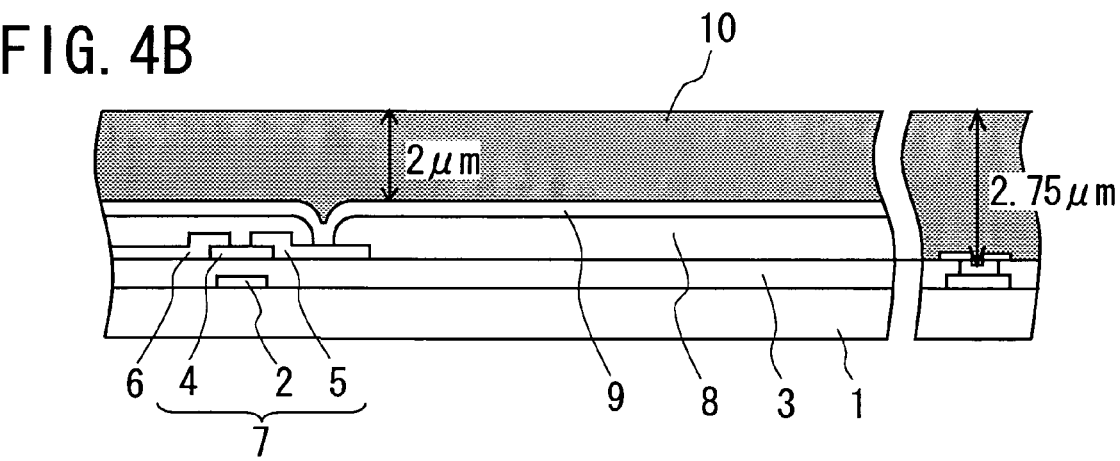

Subsequently, as shown in FIG. 4B, a photosensitive organic resin layer 10 is formed on the transparent electrode layer 9 by a spin coating method. The layer 10 is to make inequalities (i.e., projections and depressions) of a reflection electrode layer for raising the visibility. The layer 10 is made of a photosensitive acrylic resin, such as PC403, 415G, or 405G manufactured by JSR.

Since the surface of the photosensitive organic resin layer 10 coated is flat, the thickness of the layer 10 varies according to the projections and depressions caused by the respective parts on the plate 1. For example, the thickness of the layer 10 in the transmission region 22b of the display section 22 is approximately 2 µm. On the other hand, the thickness of the layer 10 in the terminal section 23 is approximately 2.75 µm because the gate dielectric layer 3 (550 nm in thickness) and the passivation layer 8 (200 nm in thickness) do not exist in the section 23.

Figure 4C:
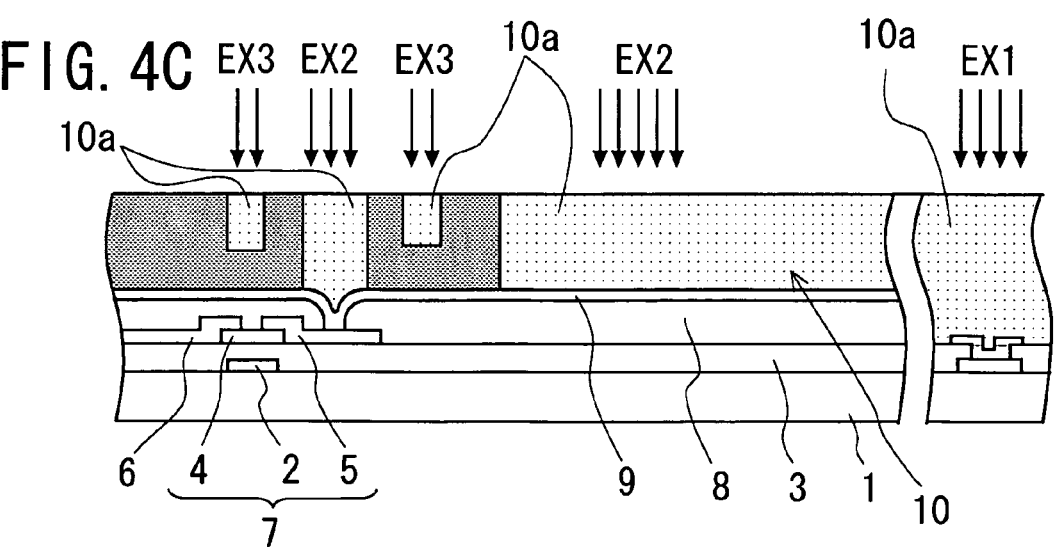

Therefore, as shown in FIG. 4C, the photosensitive resin layer 10 in the transmission region 22b and the contact-hole area of the display section 22 is exposed to the exposing light at an exposure value EX2 while the layer 10 in the terminal section 23 is exposed to the exposing light at an exposure value EX1, where EX2<EX1. Moreover, the inequalities of the layer 10 are formed in the reflection region 22a and therefore, the layer 10 in the reflection region 22a of the display section 22 is exposed to the exposing light at an exposure value EX3, where EX3<EX2. The value EX3 is determined in such a way that about half thickness of the layer 10 is removed. As a result, soluble regions 10a are selectively formed in the layer 10, as shown in FIG. 4C. The regions 10a are soluble in a developer solution used.

Figure 5A:
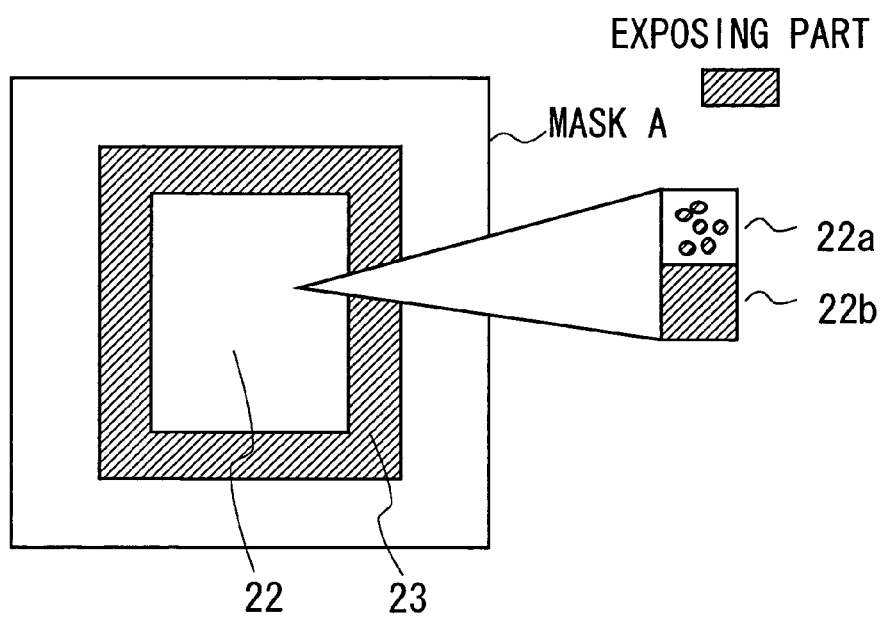
FIGS. 5A to 5C are schematic plan views showing the structure of the masks used in the method of fabricating the active-matrix substrate of the semi-transmissive type. LCD device according to the first embodiment, respectively.
Figure 5B:
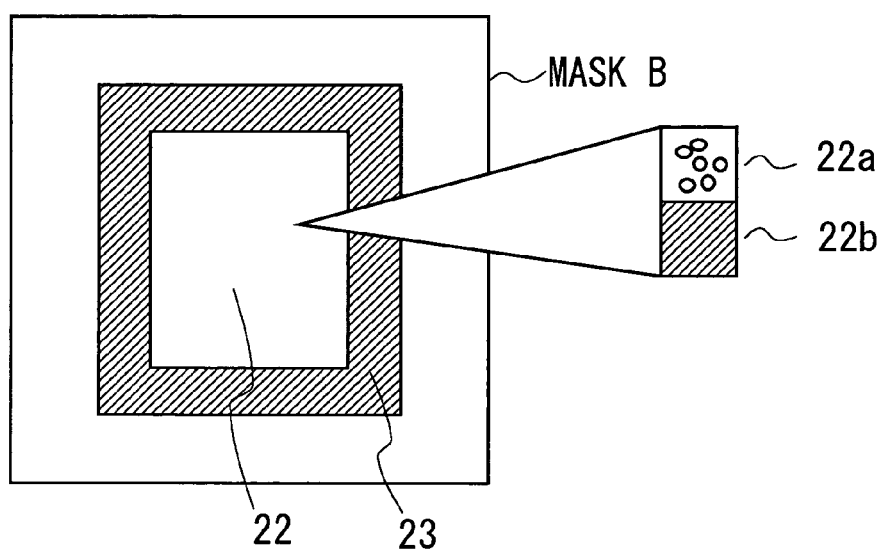
Figure 5C:
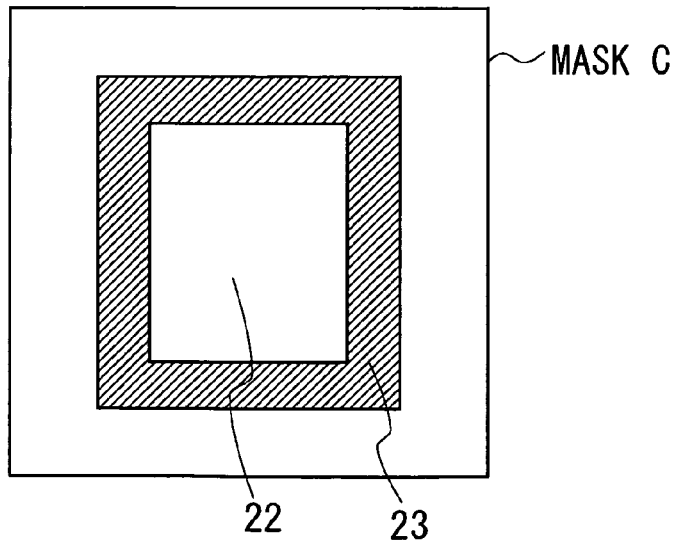

The said exposure process is carried out by a known stepper shown in FIGS. 8A and 8B using three different masks A, B, and C shown respectively in FIGS. 5A, 5B, and 5C. In other words, this process includes three shots where the different masks A, B, and C are respectively used.

The mask A is designed for forming the inequalities (i.e., the projections and depressions) of the layer 10 in the reflection regions 22a of the display section 22. As shown in FIG. 5A, with the mask A, the reflection regions 22a are selectively exposed to the exposing light, thereby forming the projections and depressions of the layer 10 in the respective regions 22a. Moreover, the whole transmission regions 22b of the display section 22 and the whole terminal section 23 are exposed to the same light.

The mask B is designed for selectively removing the layer 10 in the transmission regions 22b of the display section 22. As shown in FIG. 5B, with the mask B, the whole transmission regions 22b of the display section 22 are exposed to the exposing light. Moreover, the whole terminal section 23 is exposed to the same light.

The mask C is designed for selectively removing the layer 10 in the terminal section 23. As shown in FIG. 5C, with the mask C, the whole terminal section 23 is exposed to the exposing light.

Therefore, the reflection regions 22a of the display section 22 are selectively exposed to the exposing light once using the mask A, thereby forming the projections and depressions of the layer 10 in the respective regions 22a. The transmission regions 22b of the display section 22 is exposed to the light twice using the masks A and B. The terminal section 23 is exposed to the light three times using the masks A, B, and C.

The use of the masks A, B, and C in separate shots is to prevent the mask image reflection problem. Each of the masks A, B, and C is three-layer structured, in other words, each of these masks is formed by a CrO/Cr/CrO structure comprising a light-shielding layer of Cr, and anti-reflection layers of CrO located at each side of the Cr layer, as shown in FIG. 9. This is to suppress the irregular or stray light reflected by the blind 25 of the stepper to the photosensitive organic resin layer 10. The said exposure process is carried out while keeping the blind 25 fully open.

The total exposure values of the respective regions or areas are as follows:

(i) The inequality areas of the reflection region 22a of the display section 22:
  100 mJ applied in one shot using the mask A=100 mJ
(ii) The transmission regions 22b of the display section 22:
  (100 mJ+100 mJ) applied in two shots using the masks A and B=200 mJ
(iii) The terminal section 23:
  (100 mJ+100 mJ+100 mJ) applied in three shots using the masks A, B, and C=300 mJ Each of the above total exposure values (i) and (ii) is the sum of the exposure values applied in each shot. This is due to taking the repetition of the exposure steps (i.e., shots) into consideration.

After the above-described exposure process is completed, the photosensitive organic resin layer 10 thus exposed is developed using an alkali development solution. In this development process, the layer 10 is patterned to have desired projections and depressions, and hollow spaces by utilizing the dissolution rate difference among the respective exposed and unexposed parts of the layer 10. For example, the layer 10 thus exposed is kept in the development solution at a temperature of 220° C. for about one hour, resulting in the patterned layer 10 as desired.

Figure 2:
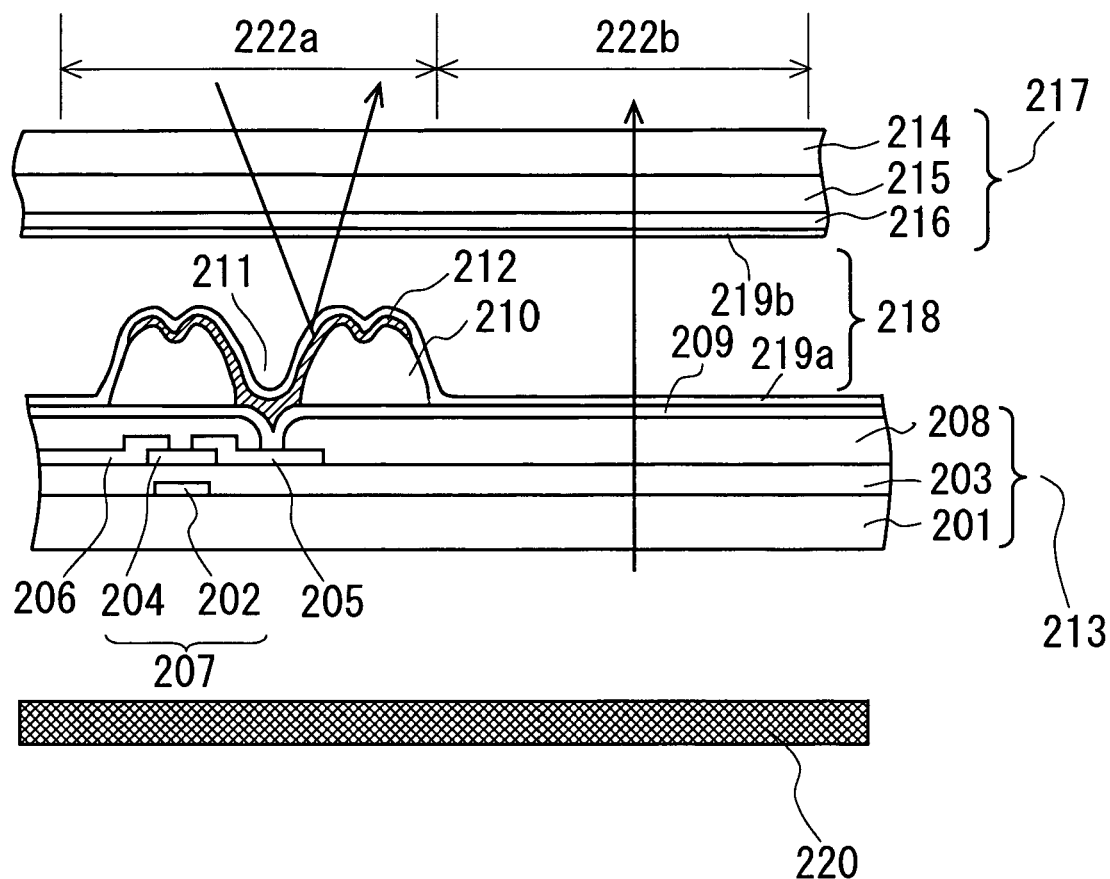
FIG. 2 is a partial cross-sectional view showing the structure of a prior-art semi-transmissive type LCD device.
Figure 3:
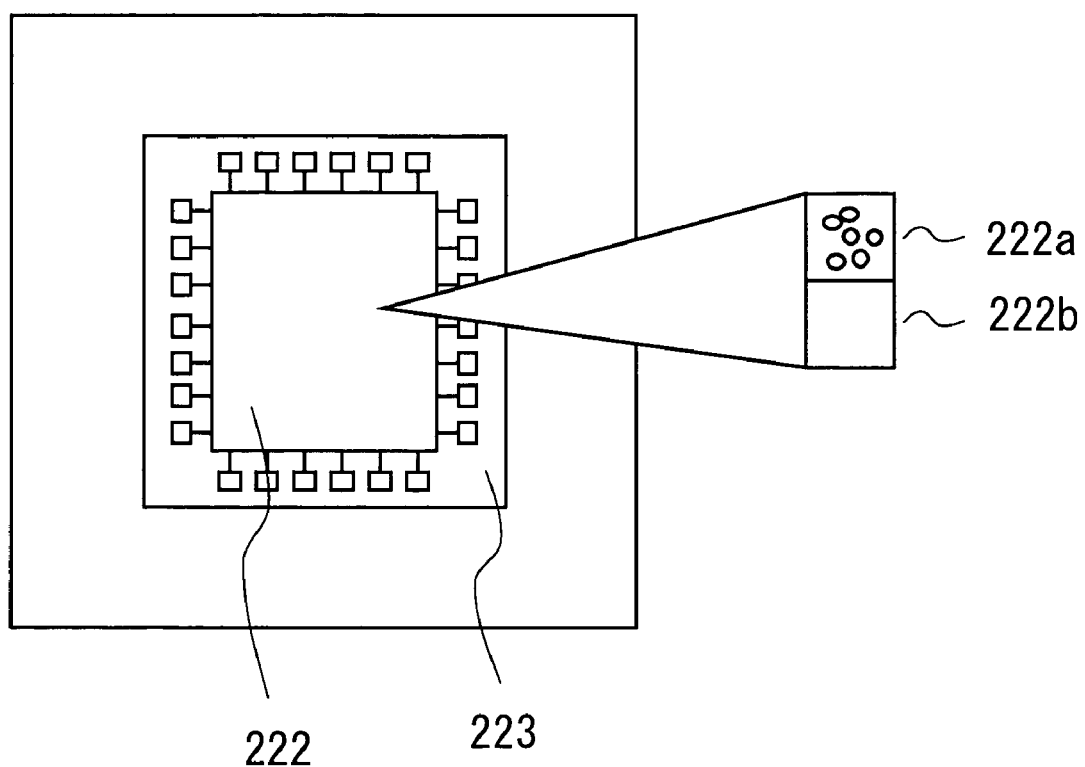
FIG. 3 is a schematic plan view showing the structure of the prior-art semi-transmissive type LCD device of FIG. 2.

Subsequent to the development process of the layer 10, although not shown, a molybdenum (Mo) layer (thickness: 200 nm) and an aluminum (Al) layer (thickness: 100 nm) are successively formed on the patterned photosensitive organic resin layer 10 by a sputtering or evaporation method. While selectively covering the reflection regions 22a with a patterned resist layer, the Mo and Al layers are selectively etched by a dry or wet etching method, thereby forming reflection electrode layers (like the reflection electrode layer 212 in FIG. 2) on the inequalities of the layer 10 in the reflection regions 23a.

Thereafter, an alignment layer made of a polyimide is formed to cover the reflection electrode layers and the exposed surface of the layer 10. Thus, the active-matrix substrate is completed.

On the other hand, the opposite substrate, on which a color filter, an opposite electrode, and an alignment layer are formed, is prepared. Then, the active-matrix substrate and the opposite substrate are coupled with each other in such a way as to sandwich a liquid-crystal layer between them. As a result, the semi-transmissive type LCD device is completed. The structure of the device thus completed is approximately the same as the structure shown in FIG. 2.

With the method of fabricating a LCD device according to the first embodiment, as explained above, in the exposure process of the photosensitive organic resin layer 10, the total exposure value to the display section 22 is decreased compared with the total exposure value to the terminal section 23 according to the thickness difference (i.e., approximately 0.75 μm) between the sections 22 and 23 due to the passivation layer 8 and the gate dielectric layer 3. Therefore, the total exposure values to the display and terminal sections 22 and 23 are respectively optimized. As a result, the problems such as the "stage image transfer" and "mask image reflection" due to over exposure are effectively prevented.

Moreover, the respective parts of the layer 10 are exposed to the light using the different masks A, B, and C in the separate shots while the blind 25 is kept fully open. The exposing light is irradiated to the masks A, B, and C from their back surfaces. Thus, the "mask image reflection" problem due to irregular or stray light reflected by the edges of the blind 25 is effectively prevented. Additionally, each of the masks A, B, and C has the pattern with the CrO/Cr/CrO structure and therefore, this advantage is enhanced.

Second Embodiment

Next, a method of fabricating a semi-transmissive type LCD device according to a second embodiment is explained below. In the method of the second embodiment, a half-tone mask (i.e., a gray-tone mask) is used to reduce the count of the necessary shots for the exposure process of the photosensitive organic resin layer.

First, similar to the method of the first embodiment, a metal such as Cr is deposited on a transparent, dielectric plate (e.g., a glass plate) 1 and patterned, thereby forming gate lines (not shown), gate electrodes 2 of TFTs 7, common storage lines (not shown), and auxiliary storage electrodes (not shown) on the plate 1. Next, a gate dielectric layer 3, which is made of $SiO_2$, $SiN_x$, or $SiO_x$, is formed on the plate 1 to cover the gate lines, the gate electrodes 2, the common storage lines, and the auxiliary storage electrodes. Island-shaped a-Si layers 4 are formed and thereafter, data lines (not shown), drain electrodes 6 and source electrodes 5 of the TFTs 7, and storage electrodes (not shown) are formed on the gate dielectric layer 3. A passivation layer 8 made of $SiN_x$ is formed to cover them. The layer 8 is selectively removed to form contact holes in the contact-hole areas over the source electrodes 5 and in the terminal section 23. A transparent electrode layer 9 made of ITO is formed on the passivation layer 8 to be connected to the source electrodes 5 by way of the corresponding contact holes of the layer 8. A photosensitive organic resin layer 10 is formed on the layer 9.

Next, to pattern the photosensitive organic resin layer 10, an exposure process is carried out. In the above-described first embodiment, the exposure process for the layer 10 includes three shots where the different masks A, B, and C and the different exposure values EX1, EX2, and EX3 are used respectively. Unlike this, in the second embodiment, any one of the three shots using the masks A, B, and C is carried out and thereafter, the remainder is carried out in one shot using a half-tone mask.

For example, first, the photosensitive organic resin layer 10 in the inequality areas of the reflection regions 22a of the display section 22 is exposed to the exposing light using the mask A at the exposure value EX3. Thereafter, the layer 10 in the contact-hole areas of the reflection regions 22a of the display section 22 and the transmissions regions 22b thereof and in the terminal section 23 is exposed to the exposing light using a halftone mask 36 shown in FIG. 10 at the exposure values EX1 and EX2.

Figure 10:
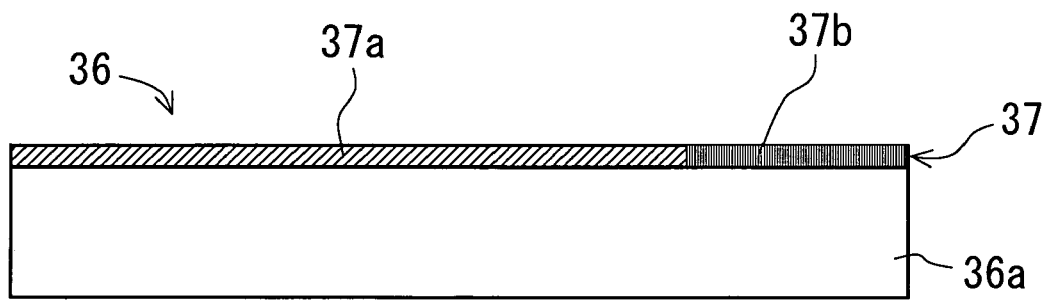
FIG. 10 is a schematic cross-sectional view of a reticle serving as a half-tone mask used in a method of fabricating a semi-transmissive type LCD device according to a second embodiment of the invention, in which the pattern formed on the glass plate includes a light-shielding part and a half-tone part.

The half-tone mask 36 shown in FIG. 10 is formed by a glass plate 36a and an exposure pattern 37 formed on the plate 36a. The pattern 37 has a region 37a for the exposure value EX2 and a region 37b for the exposure value EX1, where EX1>EX2. This means that the exposing light penetrating through the region 37b is irradiated to the layer 10 at the value EX1 while the exposing light penetrating through the region 37a is attenuated to the value EV2 from EV1.

Thus, in the second embodiment, the exposure process for the layer 10 is carried out through two shots.

After the above-described exposure process is completed, the photosensitive organic resin layer 10 thus exposed is developed using an alkali development solution similar to the first embodiment. Thus, the layer 10 is patterned as desired.

Subsequent to the development process of the layer 10, the same process steps as those in the first embodiment are carried out. As a result, the active-matrix substrate is completed.

Thereafter, the active-matrix substrate and the opposite substrate are coupled with each other in such a way as to sandwich a liquid-crystal layer between them. Thus, the semi-transmissive type LCD device is completed. The structure of the device thus competed is approximately the same as the structure shown in FIG. 2.

With the method of fabricating a LCD device according to the second embodiment, obviously, the same advantages as those of the first embodiment are obtainable. The method of the second embodiment has an additional advantage that the count of the necessary shots for the exposure process of the photosensitive organic resin layer 10 is reduced by one compared with the method of the first embodiment.

In addition, the formation of the photosensitive organic resin layer 10 is realized by one coating process and the exposure of the layer 10 is realized by three shots in the above-described first embodiment. In the second embodiment, the formation of the photosensitive organic resin layer 10 is realized by one coating process and the exposure of the layer 10 is realized by two shots. However, the invention is not limited to these cases. For example, the formation of the layer 10 may be realized by two or more coating processes, or the layer 10 may be formed to have a multi-layer structure. The exposure of the layer 10 may be realized by the combination of a shot where the light is irradiated to the whole layer 10 at a less exposure value (e.g., EX2) and another shot where the light is selectively irradiated to the layer 10 at an exposure value difference (e.g., EX1−EX2).

In the first and second embodiments, each of the masks A, B, and C has the anti-reflection layers made of CrO. However, the invention is not limited to this. The anti-reflection layers may be omitted. The invention is applicable to any type or structure of the LCD device if it comprises a photosensitive organic resin layer having a thickness variation as an insulating layer, and the exposure value to the photosensitive organic resin layer needs to be entirely optimized.

Third Embodiment

Figure 6:
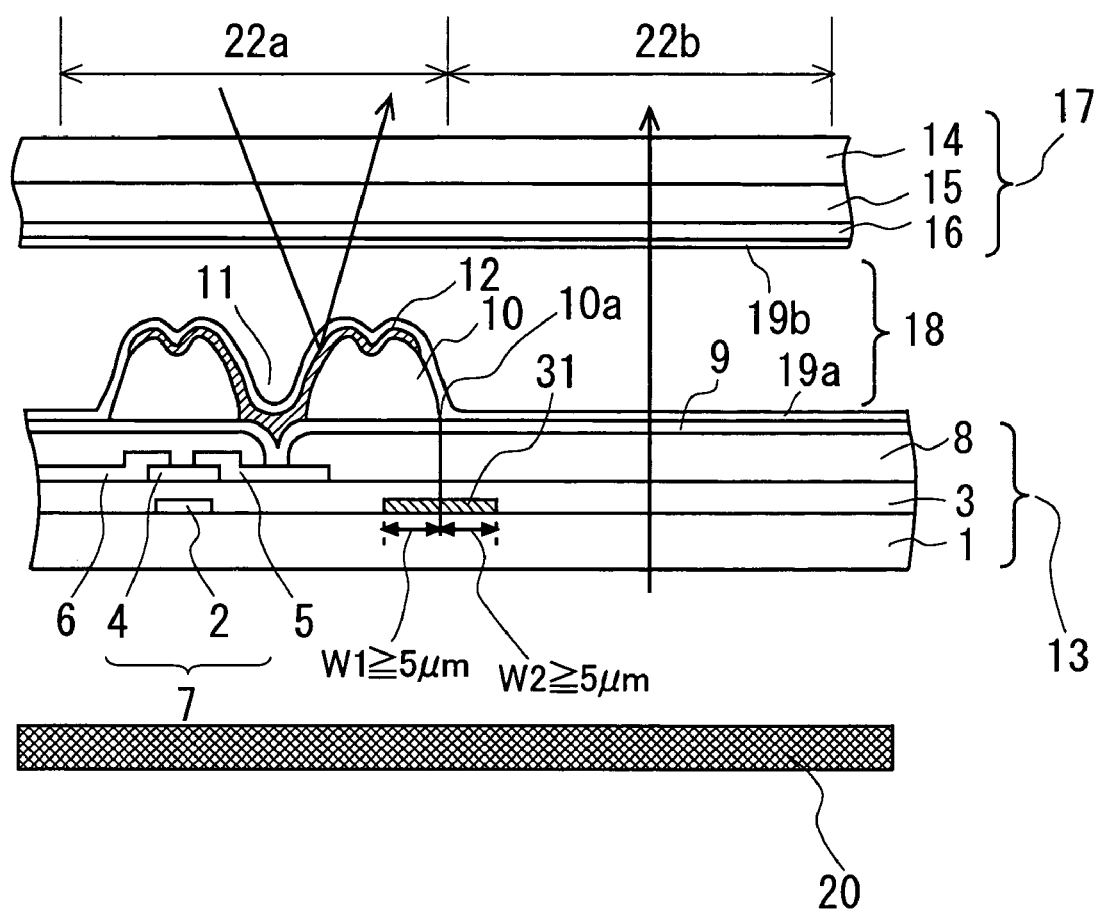
FIG. 6 is a partial cross-sectional view showing the structure of a semi-transmissive type LCD device according to a third embodiment of the invention.

FIG. 6 shows the structure of a semi-transmissive type LCD device according to a third embodiment. The feature of the device of the third embodiment exists in a structure for preventing the image transfer or reflection problem. The remaining structure of the said device is the same as the prior-art device shown in FIG. 2.

Specifically, the device of the third embodiment comprises an active matrix substrate 13 on which TFTs 7 are formed, an opposite substrate 17 on which a color filter 15 and a black matrix (not shown) are formed, a liquid-crystal layer 18 sandwiched by the substrates 13 and 17, and a backlight 20 located behind the active-matrix substrate 13. Although many pixel areas are arranged in a matrix array, only one pixel area is shown in FIG. 6 for simplification of description.

On the active-matrix substrate 13, gate lines (not shown), data lines (not shown), TFTs 7, and pixel electrodes (not shown) are formed over a transparent, dielectric plate 1. The TFTs 7, each of which comprises a gate electrode 2, an island-shaped a-Si layer 4, a source electrode 5, and a drain electrode 6, are arranged near the respective intersections of the gate and data lines. The drain electrodes 6 of the TFTs 7 are connected to the corresponding data lines. The source electrodes 5 of the TFTs 7 are connected to the corresponding pixel electrodes. The gate electrodes 2 of the TFTs 7 are formed on the plate 1. A common gate dielectric layer 3 is formed on the plate 1 to cover the gate electrodes 2. A passivation layer 8 is formed on the layer 3 to cover the TFTs 7. A transparent electrode layer 9, which is made of ITO, is formed on the passivation layer 8 to be connected to the source electrodes 5 by way of the corresponding contact holes of the layer 8.

Each of the pixel areas is divided into a reflection region 22a that reflects ambient light and a transmission region 22b that allows the light from the backlight 20 to penetrate through the same.

In the reflection region 22a, a photosensitive organic resin layer 10 is selectively formed on the electrode layer 9. The layer 10 has inequalities, i.e., projections and depressions. A reflection electrode layer 12, which is made of Al or an alloy of Al, is selectively formed on the layer 10. The reference numeral 11 denotes the contact hole penetrating through the photosensitive organic resin layer 10. An alignment layer 19a is formed on the layer 10 to cover the reflection electrode layer 12. On the other hand, in the transmission region 22b, the photosensitive organic resin layer 10 does not exist and the alignment layer 19a is formed directly on the electrode layer 9.

On the opposite substrate 17, the color filter 15 and the opposite electrode 16 are successively formed on a transparent, dielectric plate 14. An alignment layer 19b is formed on the electrode 16.

As described previously, the stage image transfer problem is caused by the following reason. Specifically, when the exposing light is excessively irradiated to the transmission regions 22b of the display section 22, the light penetrates through the active-matrix substrate 13 and is reflected by the surface of the exposure stage 24 and the chucks/pins 24a, thereby affecting the photosensitive organic resin layer 10. Due to this effect, the dissolution rate of the layer 10 will deviate from its desired values. As a result, an image of the exposure stage 24 (i.e., the stage surface and the chucks and/or pins) will be slightly transferred to the layer 10 after the development process is completed, causing the "stage image transfer" problem.

The inventors found that the transferred image of the stage 24 was observed at the edges 10a of the photosensitive organic resin layer 10 formed in the neighborhood of the boundary between the transmission region 22b and the reflection region 22a of each pixel area. Therefore, they had an opinion that the effect to prevent the "stage image transfer" problem might be enhanced if the light penetrating through the edges 10a of the layer 10 was shielded or blocked. The device of the third embodiment was created based on this supposition.

As shown in FIG. 6, a light-shielding layer 31 for the pixel area is formed on the plate 1 of the active-matrix substrate 13 in the neighborhood of the boundary between the transmission region 22b and the reflection region 22a. The layer 31 is formed by a corresponding one of the storage electrodes. The layer 31 is made of the same metal as the gate electrodes 2.

The light-shielding layer 31 may be separately formed from the other layers or components to shield the light penetrating through the edges 10a of the layer 10. However, the common storage lines, the storage electrodes and the auxiliary capacitor electrodes are usually formed on the substrate 13. Therefore, the function of the layer 31 may be realized by changing the pattern or shape of the common storage line or the storage electrode or the auxiliary capacitor electrode. Moreover, the light-shielding layer 31 is not always necessary to be in the same level as the gate electrodes 2. The layer 31 may be formed in the same level as the source and drain electrodes 5 and 6 or on the back or outer surface of the plate 1 of the substrate 13. It is sufficient that the layer 31 is located behind the photosensitive organic resin layer 10, i.e., on the opposite side of the opposite substrate 17 with respect to the layer 10.

To confirm the effect of the light-shielding layer 31 in the device according to the third embodiment, the inventors conducted a test under the condition that the exposure value EX3 was 100 mJ and the exposure values EX1 and EX2 were 300 mJ. The result of this test is shown in Table 4 below, where W1 and W2 are inward and outward distances along the plate 1 from the edge 10a of the photosensitive organic resin layer 10 in the neighborhood of the boundary between the reflection and transmission sections 22a and 22b, respectively.

TABLE 4

| EXPOSURE VALUE IN IN-EQUALITY AREAS | EXPOSURE VALUE IN REMOVAL AREAS | EXPOSURE VALUE IN TERMINAL SECTION | DIS-TANCES W1, W2 | DISPLAY UNEVENNESS LEVEL STAGE IMAGE TRANSFER |
|---|---|---|---|---|
| 100 mJ | 300 mJ | 300 mJ | 1 μm | Δ |
| 100 mJ | 300 mJ | 300 mJ | 3 μm | Δ |
| 100 mJ | 300 mJ | 300 mJ | 5 μm | ΔO |
| 100 mJ | 300 mJ | 300 mJ | 7 μm | O |
| 100 mJ | 300 mJ | 300 mJ | 9 μm | O |

As seen from Table 4, to effectively prevent the "stage image transfer" problem, the inward and outward distances W1 and W2 need to be 5 μm or greater.

As explained above, with the semi-transmissive type LCD 10 device according to the third embodiment, the light penetrating through the edges 10a of the photosensitive organic resin layer 10 is shielded or blocked by the light-shielding layer 31 made of metal. Thus, there is an additional advantage that the effect to prevent the "stage image transfer" problem is enhanced compared with the LCD devices fabricated by the methods of the first and second embodiments.

OTHER EMBODIMENTS

It is needless to say that the present invention is not limited to the above-described first to third embodiments. Any modification is applicable to these embodiments. For example, these embodiments are of the semi-transmissive type LCD device; however, the invention is applicable to the reflective type LCD device.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A method of fabricating a LCD device, comprising the steps of:

forming a photosensitive organic material layer on or over a transparent plate, the photosensitive organic material layer being divided into a display section and a terminal section located outside the display section, the display section including a reflection region and a contact-hole area, and the photosensitive organic material layer having a first thickness in the reflection region, a second thickness different from the first thickness in the contact-hole area, and a third thickness different from the first and second thicknesses in the terminal section;

exposing the photosensitive organic material layer to exposing light in such a way that the photosensitive organic material layer in the reflection region is exposed at a first exposure value according to the first thickness, the photosensitive organic material layer in the contact-hole area is exposed at a second exposure value according to the second thickness, and the photosensitive organic material layer in the terminal section is exposed at a third exposure value according to the third thickness;

developing the photosensitive organic material layer exposed, thereby forming a first substrate;

forming a second substrate; and coupling the first substrate and the second substrate with each other in such a way as to sandwich a liquid-crystal layer therebetween.

2. The method according to claim 1, wherein in the step of exposing the photosensitive organic material layer, the contact-hole area and the terminal section are exposed to the light in one shot at the second exposure value, and the terminal section is again exposed to the light in another shot at a difference between the second exposure value and the third exposure value.

3. The method according to claim 1, wherein in the step of exposing the photosensitive organic material layer, the contact-hole area and the terminal section are respectively exposed to the light in one shot at the second and third exposure values using a half-tone mask.

4. The method according to claim 1, wherein in the step of exposing the photosensitive organic material layer, the reflection region, the contact-hole area, and the terminal section are respectively exposed to the light in separate shots using different masks;

and wherein a blind of a stepper used is kept fully open.

5. The method according to claim 1, wherein in the step of exposing the photosensitive organic material layer, the reflection region, the contact-hole area, and the terminal section are respectively exposed to the light using different masks;

and wherein each of the masks has a three-layer structure comprising a light-shielding layer for an exposing pattern, and two anti-reflection layers located at each side of the light-shielding layer.

* * * * *